United States Patent [19]

Koscho

[11] 4,315,711
[45] Feb. 16, 1982

[54] TILTING SUPPORT PACKING APPARATUS
[75] Inventor: Joseph G. Koscho, Modesto, Calif.
[73] Assignee: Libbey-Owens-Ford Company, Toledo, Ohio
[21] Appl. No.: 101,122
[22] Filed: Dec. 7, 1979
[51] Int. Cl.³ ............................................. B65G 57/28
[52] U.S. Cl. .................................... 414/97; 414/681; 414/754; 206/448
[58] Field of Search .................. 414/38, 97, 421, 425, 414/680, 681, 728, 754, 778; 206/448, 449, 454; 271/210

[56] References Cited
U.S. PATENT DOCUMENTS
1,286,801 12/1918 Schumacher ........................ 414/754
2,862,629 12/1958 Aberle ............................ 414/778 X
2,916,164 12/1959 Avery ............................ 414/778 X
3,753,505 8/1973 Ouska .................................. 414/778

Primary Examiner—Robert W. Saifer
Attorney, Agent, or Firm—Collins, Oberlin & Darr

[57] ABSTRACT

An apparatus having a horizontally disposed manually rockable frame for supporting and tilting a shipping container from its normal upright transporting attitude through an angle of less than 90° to an attitude included from the horizontal for packing glass sheets therein. The glass sheets are manually placed in the shipping container when it is supported in the inclined packing attitude with sheets of separating material interleaved therebetween and, when packed, the container is returned to its upright transporting attitude.

10 Claims, 7 Drawing Figures

TILTING SUPPORT PACKING APPARATUS

BACKGROUND OF THE INVENTION

1. Field of the Invention

The present invention generally relates to the packing of shipping containers with glass sheets or similar articles on edge and, more particularly, to an apparatus for manually tilting the shipping containers to an inclined attitude for packing them with the sheets.

2. Description of the Prior Art

Glass sheets are normally handled and shipped in a substantially vertical position to minimize damage to the glass. According to one method of packing glass sheets in shipping containers or racks, it is customary to manually place the glass sheets on edge in the container with sheets of paper inserted between the adjacent glass surfaces. Conventionally, this packing is performed with the container in an upright position and with an operator first picking up a sheet of glass such as for example, an automotive side light from a conveyor or buck and placing it within the container, then placing a sheet of paper against the exposed glass surface, after which a second glass sheet is laid against the paper and so on. It has been found that in using this method of packing glass sheets in shipping containers with the containers in their normal upright position, the glass sheets tend to be not seated securely against the preceding sheet. In other words, voids are left in the glass pack. This condition produces a loose pack and leads to scratching and/or breakage during subsequent handling and shipment, thus rendering the glass sheets unfit for use. Accordingly, it is desirable to provide a tighter packing of the glass sheets in loading the shipping containers.

The present invention provides a novel, manually operable apparatus for tilting shipping containers or racks so that their upright rear supporting members are in an inclined attitude, thus providing for a tighter packing of the glass sheets in the containers.

SUMMARY OF THE INVENTION

Briefly, the novel tilting packing apparatus constructed in accordance with the invention generally comprises a flat, horizontally disposed container supporting frame rockably mounted on a stationary base frame. The rockable supporting frame is adapted to be manually tilted from a loading/unloading position whereat a shipping rack is placed thereon in its substantially normal shipping attitude, to a packing position whereat the upright rear supporting members of the shipping rack are in an inclined attitude. The novel tilting apparatus may also include means for vibrating the rockable frame for insuring that the glass sheets slide down until their bottom edges securely engage the bottom supports of the shipping container.

OBJECTS AND ADVANTAGES

An object of this invention is to provide a novel tilting stand for supporting a shipping rack in an inclined attitude to facilitate the stacking of glass sheets therein and the inserting of sheets of separating material between adjacent glass surfaces by an operator.

Another object of this invention is to provide a novel tilting stand with a vibrator for jiggling the rockable supporting frame for insuring that the glass sheets slide down until their bottom edges firmly engage the bottom supports of the shipping container.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
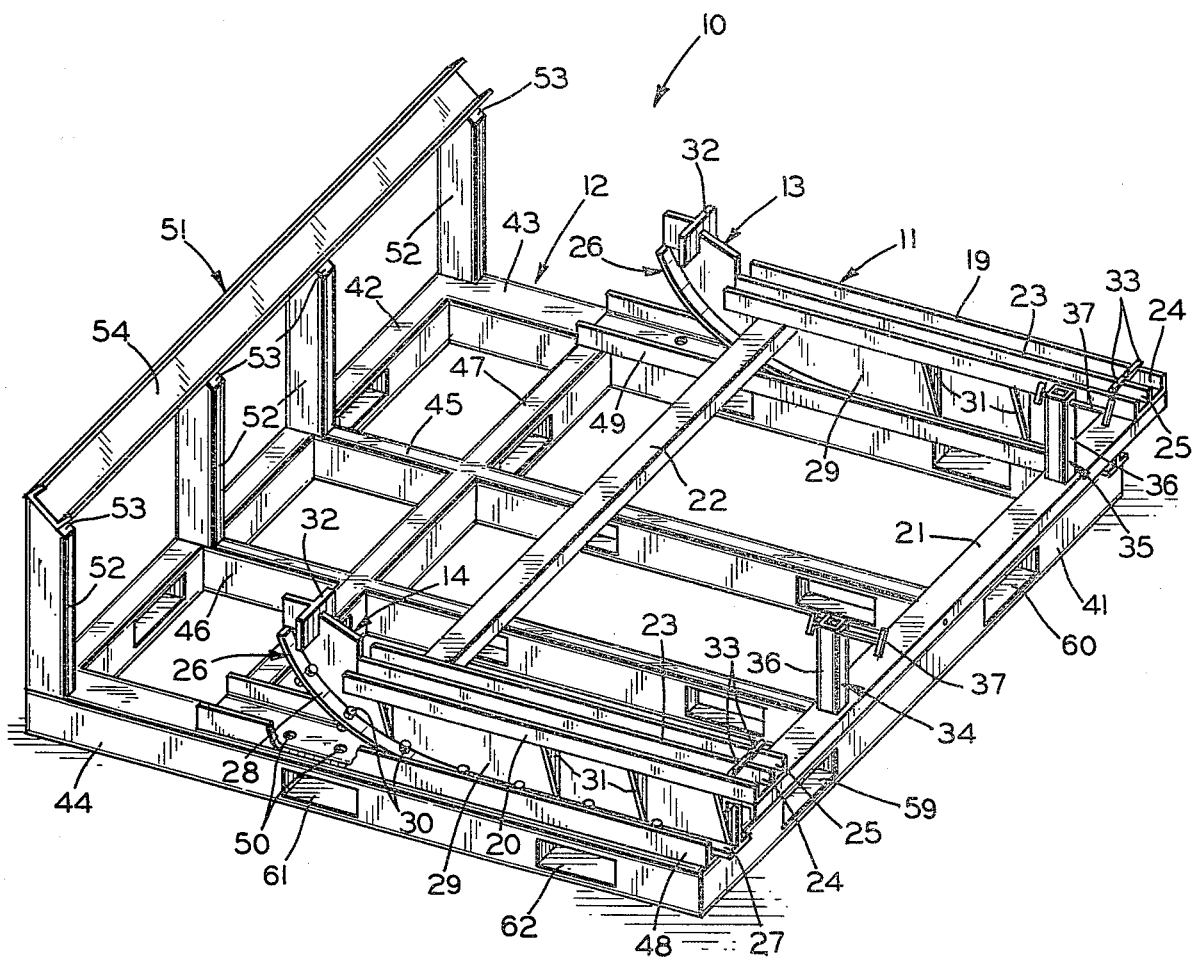
FIG. 1 is a perspective view of the rockable packing stand constructed in accordance with the invention and having parts thereof broken away for clarity.

Referring now to FIG. 1, there is illustrated a novel rockable packing stand, designated in its entirety by the reference numeral 10, which is constructed in accordance with the invention. Briefly, the packing stand 10 comprises a shipping container supporting frame 11 rockably mounted on a stationary base frame 12 together with a pair of spaced-apart rockers 13 and 14 for tilting the supporting frame 11 between a loading/unloading position and an inclined packing position. More particularly, the container supporting frame 11 is capable of being tilted on rockers 13 and 14 through a desired angle of movement; that is, through an angle of less than 90°, and preferably through an angle of between 45° and 50° so that normally vertically spaced back supports 15 and 16 of a shipping container, such as a shipping rack 17 (see FIG. 4), are inclined to the horizontal whereby they support glass sheets 18 in a somewhat vertically stacked manner during their packing in the rack 17 (see FIG. 7).

Figure 3:
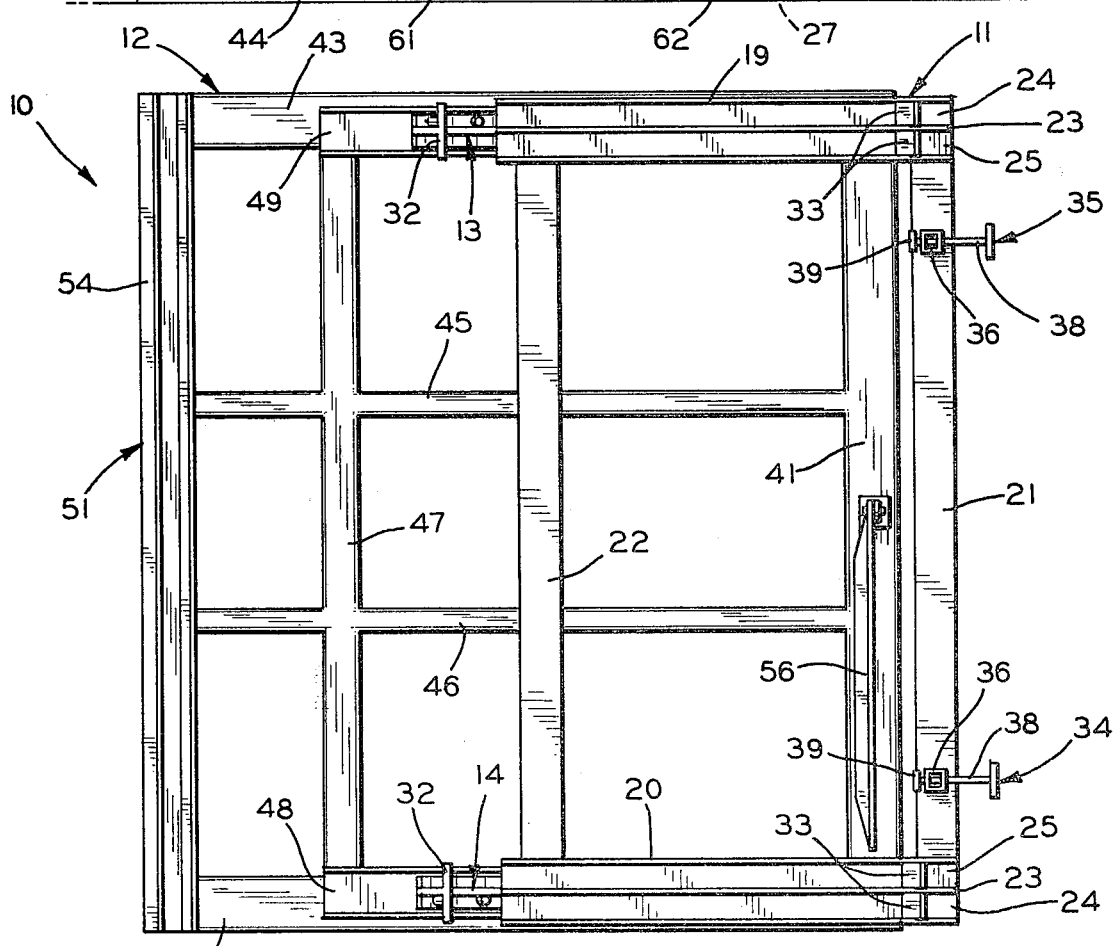
FIG. 3 is a plan view of the stand.

Referring now to FIGS. 1 and 3, the rockable supporting frame 11 is a weldment structure composed of structural steel members and generally comprises a pair of spaced-apart side supporting members 19 and 20 connected together by front and rear transversely extending channel members 21 and 22, respectively, thus forming a rectangularly shaped frame. Each side supporting member 19 and 20 is an elongated upright generally U-shaped member and may have a central flange 23 defining a pair of channels 24 and 25 for accommodating shipping racks of different sizes.

Figure 4:
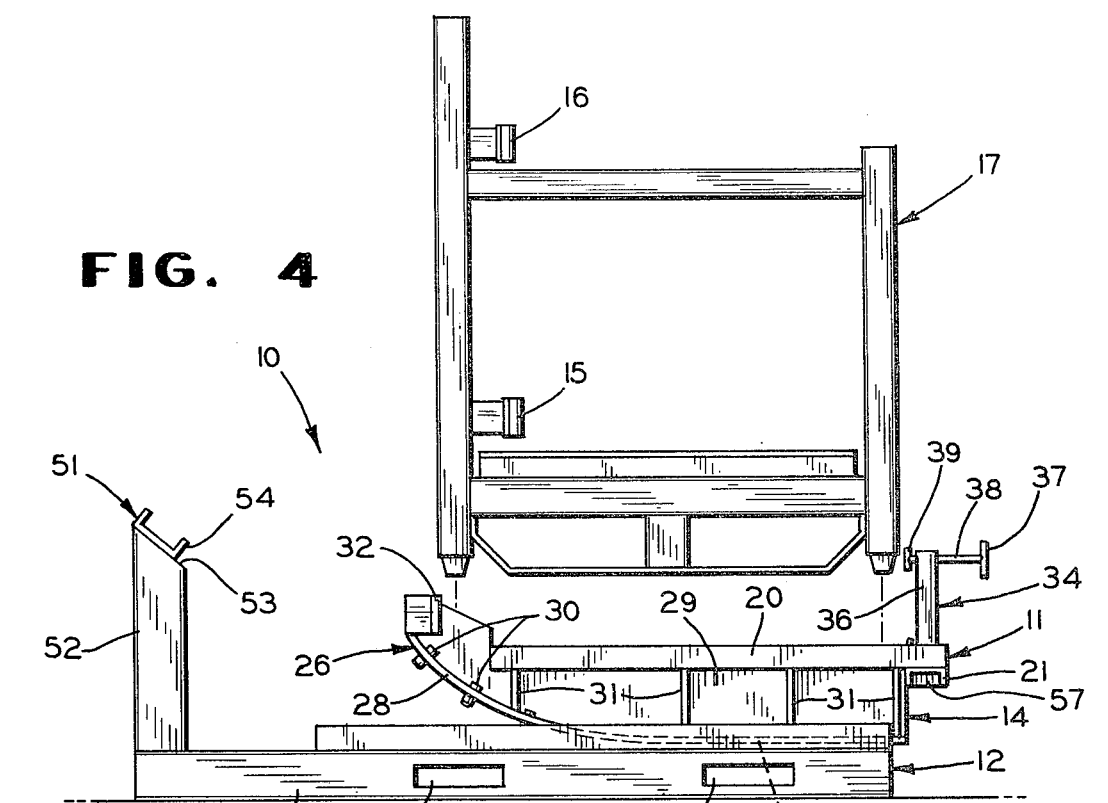
FIG. 4 is a side elevational view of the stand, together with a shipping rack illustrating the relationship therebetween.
Figure 5:
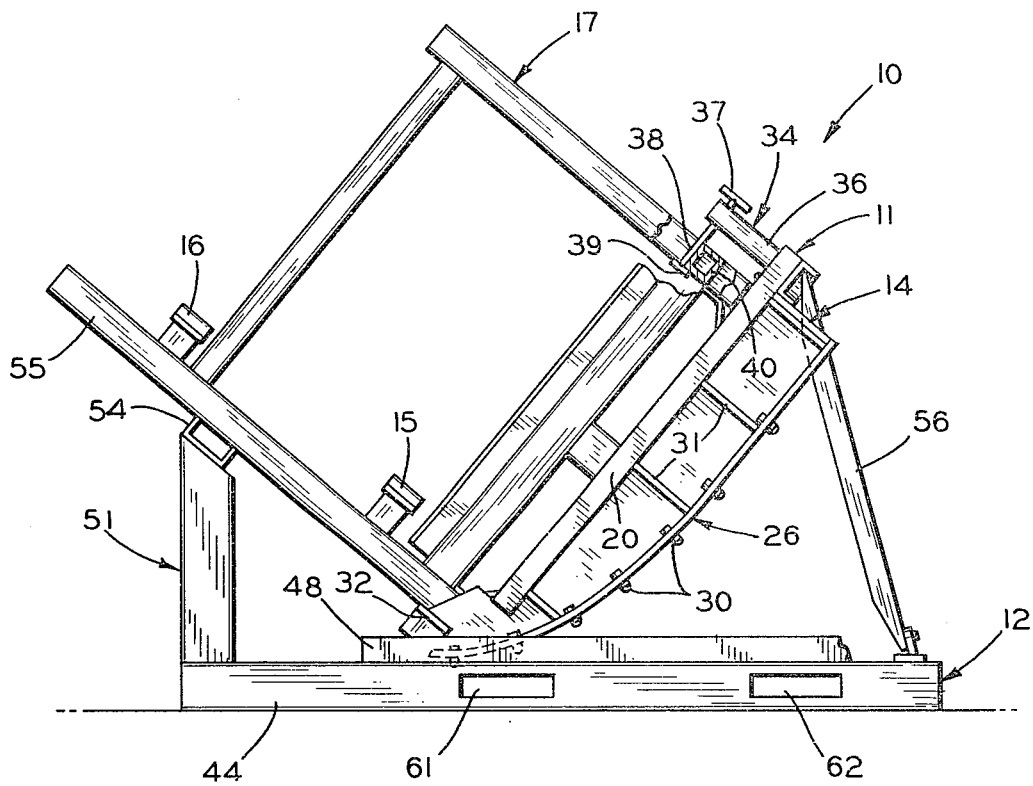
FIG. 5 is a side elevational view of the stand and shipping rack illustrating the inclined rack packing position.

Referring particularly to FIGS. 1 and 4, the rocker members 13 and 14 generally comprise a flat rocker plate 26 having an elongated linear portion 27 and a curved end portion 28, and an upstanding web member 29 configured to and extending the length of the rocker plate 26. It should be noted that the curved portion 28 is so configured and positioned with respect to the frame 11 that the fulcrum point shifts as the supporting frame 11 rocks on the base frame 12 whereby the fulcrum remains approximately beneath the center of gravity of the rack and the unit is balanced so that an operator can easily tilt the unit back or lower it even when it contains a fully loaded shipping rack. The upper edge of the web member 29 is provided with a cut-out portion for receiving the side supporting members 19 and 20 of the frame 11. As best illustrated in FIG. 5, the rocker plate 26 is provided with a plurality of protruding pins 30 spaced throughout the length thereof, the purpose of which will be described hereinafter. A plurality of triangularly shaped brackets 31 affixed to both sides of each web 29 support the bottom of the supporting members 19 and 20, thus providing a strong, rigid container supporting structure. The end of each web 29 adjacent the curved portion 28 of the rocker plate 26 is provided with a T-shaped back plate 32 and the channels 24 and 25 of the supporting members 19 and 20 are provided with guide plates 33, thus providing means for positioning the shipping rack 17 on the frame 11.

The front cross member 21 of the frame 11 is provided with a pair of spaced-apart hold-down means 34 and 35 for securing the shipping rack 17 thereon. To this end, each hold-down means 34 and 35 includes an upstanding pedestal 36 affixed to the top surface of the cross member 21 and a clamping member 37 having an arm 38 threaded through the upper end of the pedestal wherein a flange 39 secured to the arm 38 detachably clamps a lower front rail 40 of the shipping rack 17 on the rockable frame 11 (see FIG. 5).

Figure 6:
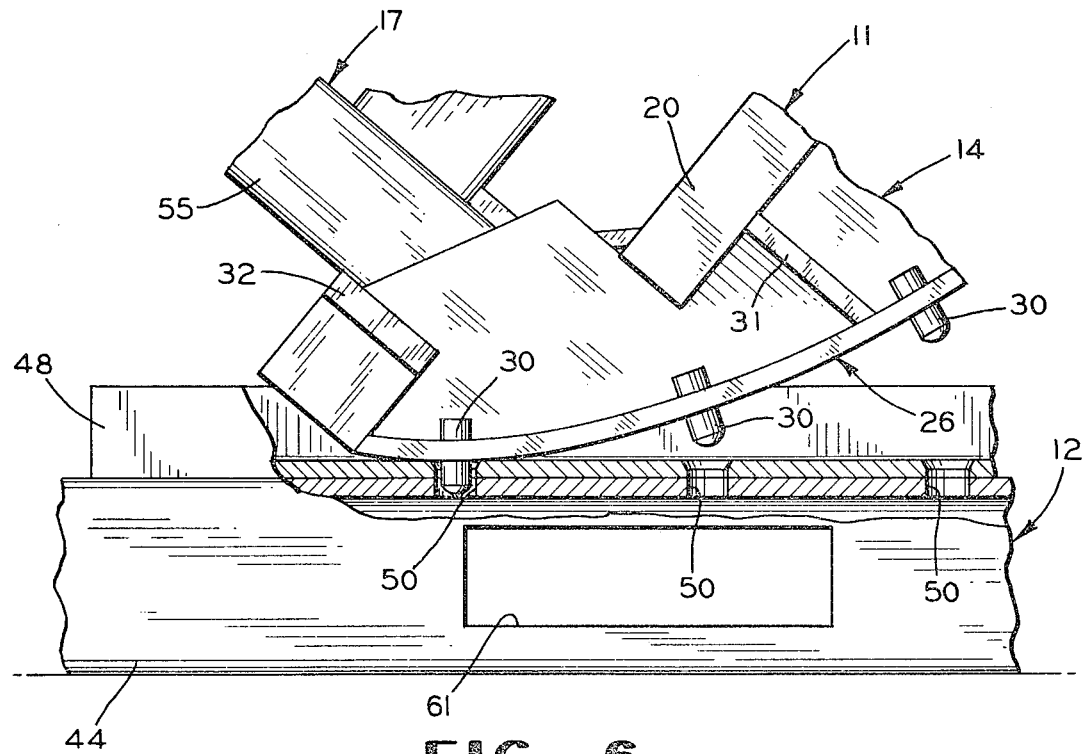
FIG. 6 is an enlarged fragmentary view of the rocking mechanism employed in the stand.

As best illustrated in FIG. 1, the stationary base frame 12 is conveniently constructed of tubular structural members in a generally rectangular form and generally comprises front and rear members 41 and 42 and side members 43 and 44. The frame 12 may include a pair of intermediate members 45 and 46 which are disposed parallel to the side members 43 and 44 and a transverse cross member 47 for rigidity. U-shaped track members 48 and 49 having apertures 50 evenly spaced with the pins 30, are provided on each side member 43 and 44 and extend between the front member 41 and the cross member 47 for receiving the pins 30 of the rocker members 13 and 14 (see FIG. 6), whereby tilting movement of the rocking frame 11 relative to the base 12 is confined to a defined path.

As previously mentioned, the container supporting frame 11 is rockable through an angle of less than 90° on the base frame 12. Thus, mounted on the rear member 42 of the base frame 12 is an upstanding means 51 for supporting the shipping rack 17 in the container packing position (see FIG. 5). Referring now to FIG. 1, the upstanding means 51 comprises at least two upstanding legs 52, each having an inclined supporting surface 53 for supporting a rail 54 which in turn supports the rear legs 55 of the shipping rack 17 in the inclined packing position. The height of the rail 53 above the base 12 and the set back thereof from the rockable frame 11 is such that the rear wall of the rack 17 is supported at a desired angle, in actual use approximately 49° from horizontal. This angular relationship places the shipping rack in a packing position that is within convenient reach of the operator, wherein the glass sheets 18 are stackable one on another on the back supports 15 and 16 of the shipping rack. Accordingly, when the shipping rack 17 is supported in the packing position, the glass sheets 18 under their own weight rest against the supports 15 and 16 and against one another, resulting in tighter nesting of the glass sheets.

Figure 2:
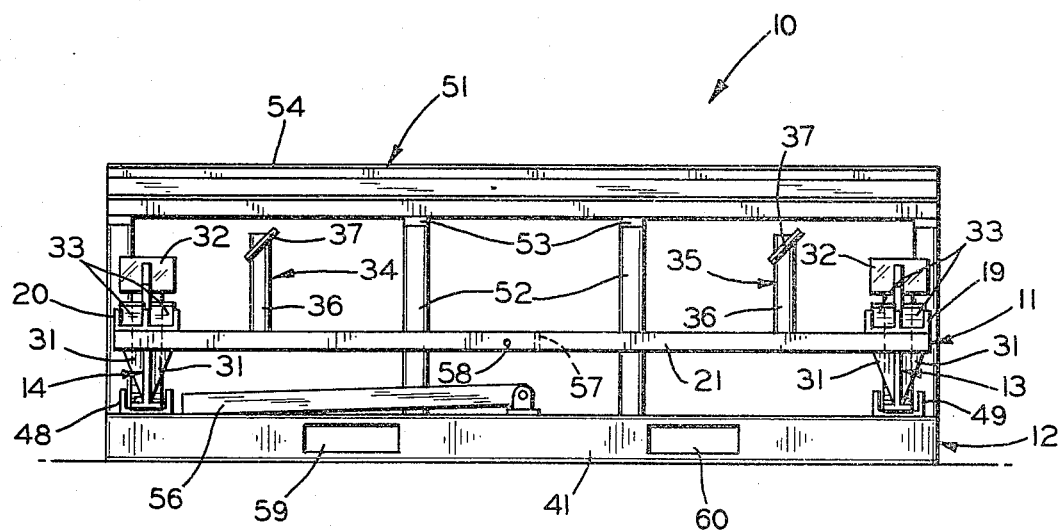
FIG. 2 is a front elevational view, of the rockable packing stand illustrated in FIG. 1.

A frame supporting strut 56 is pivotally mounted on the front member 41 of the base 12 so that it can be swung under the front cross member 21 of the frame 11 when the frame is in the tilted packing position (see FIG. 5). Lock means (see FIG. 2) comprising a stop plate 57 is provided on the front cross member 21 for holding the strut 56 in an upright position. A locking pin (not shown) may be inserted in an aperture 58 provided adjacent the stop plate 57 for holding the strut in an upright position relative to the frame.

The tilting packing stand 10 is adapted for handling by a fork lift truck. To this end, the base frame 12 is provided with a pair of horizontally aligned apertures 59 and 60 extending through the front, intermediate and rear members 41, 42 and 47, respectively, and a pair of apertures 61 and 62 extending through the side and intermediate members 43, 44, 45 and 46, respectively.

Figure 7:
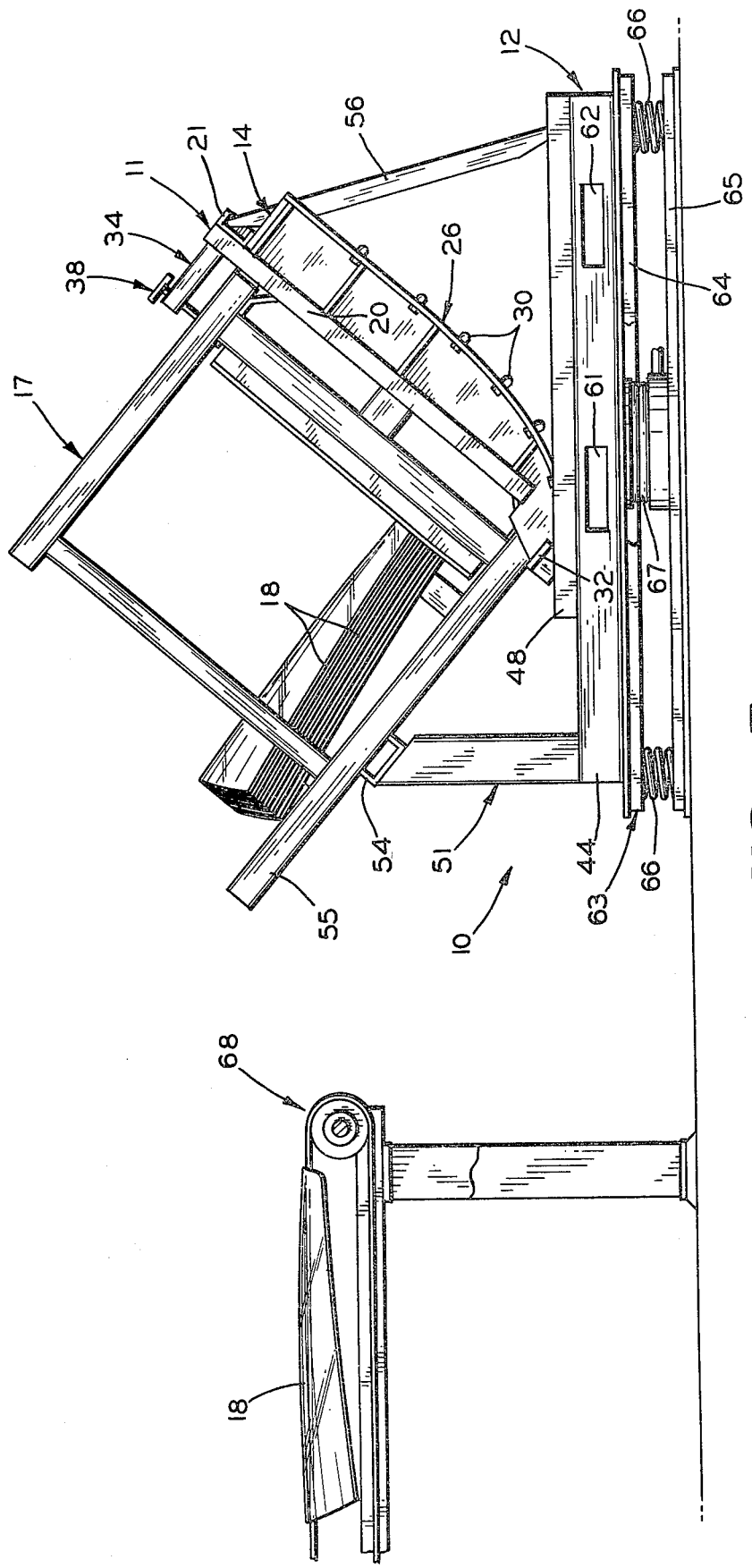
FIG. 7 is a side elevational view illustrating the stand with a partially packed rack thereon together with a vibrating apparatus.

With the rack 17 in the inclined packing position, it has been found that under some circumstances an occasional glass sheet 18 may not slide completely down into engagement with the bottom edge supports of the rack. This again could result in occasional breakage of glass sheets during subsequent shipping. To overcome this problem, a vibrating platform 63 has been provided for jiggling the packing device 10. As illustrated in FIG. 7, the vibrating platform 63 generally comprises two suitably sized horizontally disposed plates 64 and 65 separated by a heavy-duty coil spring 66 at each corner. An air vibrator 67 is disposed between the two plates 64 and 65 for jiggling the top plate during loading of the rack for insuring that the glass sheets will slide down into engagement with the bottom supports of the shipping container.

In operation, a conventional shipping container, such as the shipping rack 17, is deposited by a fork lift truck upon the side support members 19 and 20 of the rockable frame 11 when it is in the loading/unloading position. An operator then secures the rack 17 to the frame 11 by engaging the hold-down clamping means 34 and 35, and manually tilts the frame 11 and rack 17 rearwardly by raising the front of the frame 11 until the rack 17 rests against the rail 54. Next the strut 56 is swung into engagement against the stop plate 57 and the rack is then in condition for packing. The packing stand 10 containing an empty rack in tilted position is then moved into position adjacent a window fabricating line such as the conveyor 68 illustrated in FIG. 7 for manual loading. A stack of separating material may be placed within handy, convenient reach of the operator for insertion between the glass sheets 18 as they are stacked within the rack 17. Since the glass is loaded in a nearly horizontal position, the separating material is much easier to insert than when the glass is loaded in a vertical position and, as previously mentioned, the glass sheets are also stacked tightly, one on top of the other. When the rack 17 is fully loaded, the packing stand 10 and loaded rack thereon are removed to a service area where banding straps (not shown) are secured and tightened and the rockable frame 11 is manually returned to its loading/unloading position by an operator. The loaded rack is then ready for removal from the packing stand 10 by the fork lift truck.

From the foregoing, it may be seen that a novel, rockable packing stand has been provided which has not only resulted in a tighter packing of the glass sheets on a shipping rack, but has resulted in a substantial reduction of scratched and damaged sheets.

It is to be understood that the forms of the invention herewith shown and described, are to be taken as illustrative embodiments only of the same, and that various changes in the shape, size and arrangement of the parts may be resorted to without departing from the spirit of the invention.

I claim:

1. A portable, manually rockable packing stand for carrying and tilting a sheet article shipping container between an upright transporting attitude and an inclined container packing attitude, comprising:
   a. a base frame adapted to rest upon a supporting surface and including means by which said base frame can be engaged for lifting and transporting said packing stand;
   b. a pair of spaced-apart, parallel track members affixed to said base frame;
   c. a rectangularly shaped rockable frame carried by said base frame and including means for receiving the supporting legs of said shipping container, said rockable frame receiving said shipping container in an upright loading/unloading position and being manually movable between said upright position and a container packing position;
   d. a pair of spaced-apart curved rocker members affixed to the underside of said rockable frame, each of said rocker members riding on a corresponding one of said parallel track members;
   e. cooperating means on said track and rocker members confining said rocker members to rolling linear movement along said track members; and
   f. said rocker members being configured to provide a shifting fulcrum point remaining substantially beneath the center of gravity of said rockable frame and shipping container carried thereon as they are tilted whereby said rockable frame and shipping container are capable of being manually moved back and forth between said loading/unloading position and said packing position.

2. A rockable packing stand for carrying and tilting a sheet article shipping container as claimed in claim 1, wherein said cooperating means comprise a plurality of longitudinally spaced, upstanding pins affixed to said rocker members and said track members are provided with a plurality of like spaced apertures for receiving said pins.

3. A rockable packing stand for carrying and tilting a sheet article shipping container as claimed in claim 1, including hold-down means affixed to said rockable frame for clamping the shipping container to said frame.

4. A rockable packing stand for carrying and tilting a sheet article shipping container as claimed in claim 3, wherein said hold-down means comprises a pair of clamp members threadedly affixed to said rockable frame.

5. A rockable packing stand for carrying and tilting a sheet article shipping container as claimed in claim 1, including means affixed to said base frame for supporting said rockable frame in the container packing position.

6. A rockable packing stand for carrying and tilting the sheet article shipping container as claimed in claim 5, wherein said supporting means comprises a strut pivotally mounted on said base frame, said strut being engageable with an edge of said rockable frame when said rockable frame is in the container packing position.

7. A rockable packing stand for carrying and tilting a sheet article shipping container as claimed in claim 6, including means for detachably holding said strut relative to said rockable frame.

8. A rockable packing stand for carrying and tilting a sheet article shipping container as claimed in claim 7, wherein said detachable holding means comprises a stop plate affixed to said rockable frame.

9. A rockable packing stand for carrying and tilting a sheet article shipping container as claimed in claim 1, including upstanding support means affixed to said base frame for supporting the shipping container in its packing attitude when said rockable frame is in the container packing position.

10. A rockable packing stand for carrying and tilting a sheet article shipping container as claimed in claim 9, wherein said upstanding support means comprises at least two legs affixed to the rear of said base frame and an inclined horizontally disposed rail affixed to the top of said legs, whereby the shipping container rests against said rail when it is in the packing position.

* * * * *